United States Patent
Sund et al.

(10) Patent No.: US 10,633,962 B2
(45) Date of Patent: Apr. 28, 2020

(54) METHOD AND SYSTEM FOR SUBSEA SEPARATION OF PRODUCED WATER

(71) Applicants: NOV Subsea Products AS, Asker (NO); CHEVRON U.S.A. INC., San Ramon, CA (US)

(72) Inventors: Eirik Bjerve Sund, Bærums Verk (NO); Jan-Otto Reimers, Oslo (NO); Gudmund Roger Totland, Åsgårdstrand (NO); Christopher John Kalli, San Ramon, CA (US); Russell Evan Cooper, San Ramon, CA (US)

(73) Assignees: NOV SUBSEA PRODUCTS AS, Asker (NO); CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 15/737,397

(22) PCT Filed: Jun. 17, 2016

(86) PCT No.: PCT/EP2016/064001
§ 371 (c)(1),
(2) Date: Dec. 18, 2017

(87) PCT Pub. No.: WO2016/202977
PCT Pub. Date: Dec. 22, 2016

(65) Prior Publication Data
US 2018/0179878 A1    Jun. 28, 2018

(30) Foreign Application Priority Data
Jun. 17, 2015   (NO) .................................... 20150796

(51) Int. Cl.
*E21B 43/36* (2006.01)
*B01D 21/24* (2006.01)
(Continued)

(52) U.S. Cl.
CPC .......... *E21B 43/36* (2013.01); *B01D 17/0214* (2013.01); *B01D 21/10* (2013.01);
(Continued)

(58) Field of Classification Search
CPC ................ B01D 17/0214; B01D 21/10; B01D 21/2422; B01D 21/2444; B01D 21/307;
(Continued)

(56) References Cited

U.S. PATENT DOCUMENTS 4,268,392 A * 5/1981 Hayes ...................... E03C 1/264
210/532.1
5,004,051 A    4/1991 Rosendahl et al.
(Continued)

FOREIGN PATENT DOCUMENTS

EP    1 731 683    12/2006
JP    60-28880    2/1985
(Continued)

OTHER PUBLICATIONS

International Search Report dated Aug. 31, 2016 in International (PCT) Application No. PCT/EP2016/064001.
(Continued)

*Primary Examiner* — Christopher Upton
(74) *Attorney, Agent, or Firm* — Wenderoth, Lind & Ponack, L.L.P.

(57) ABSTRACT

Method and system for separation of produced water into a water fraction, a solids fraction and a hydrocarbon fraction, comprising feeding produced water into a collapsible flexible bag maintained subsea by a protection structure; operating the flexible bag at an overpressure and thereby providing a predefined geometry of the flexible bag; maintaining the produced water in the flexible bag to allow for gravitational separation of the solids fraction with a higher density than water in a lower section and optionally
(Continued)

separation of the hydrocarbon fraction with a lower density than water in an upper section; removing the water fraction from a section above the lower section; optionally removing hydrocarbons from the upper section and replacing the flexible bag to remove the solids fraction.

19 Claims, 4 Drawing Sheets

(51) Int. Cl.

| | | |
|---|---|---|
| *B01D 17/032* | (2006.01) | |
| *B01D 17/02* | (2006.01) | |
| *B01D 21/02* | (2006.01) | |
| *B01D 21/30* | (2006.01) | |
| *C02F 1/40* | (2006.01) | |
| *E21B 43/40* | (2006.01) | |
| *C02F 1/00* | (2006.01) | |
| *C02F 101/32* | (2006.01) | |
| *C02F 103/10* | (2006.01) | |

(52) U.S. Cl.
CPC ..... *B01D 21/2405* (2013.01); *B01D 21/2444* (2013.01); *B01D 21/2483* (2013.01); *B01D 21/2494* (2013.01); *B01D 21/307* (2013.01); *C02F 1/40* (2013.01); *E21B 43/40* (2013.01); *C02F 2001/007* (2013.01); *C02F 2101/32* (2013.01); *C02F 2103/10* (2013.01); *C02F 2209/03* (2013.01); *C02F 2301/02* (2013.01); *C02F 2301/066* (2013.01)

(58) Field of Classification Search
CPC ...... C02F 1/40; C02F 2301/066; E21B 43/01; E21B 43/34; E21B 43/36
USPC .... 210/747.1, 800, 803, 170.01, 519, 532.1, 210/540; 166/75.12, 267, 357; 405/210
See application file for complete search history.

(56) References Cited

U.S. PATENT DOCUMENTS

| | | | |
|---|---|---|---|
| 5,730,872 A | 3/1998 | Rhodes | |
| 6,350,375 B1* | 2/2002 | Bringedal | B01D 21/10 |
| | | | 210/170.01 |
| 7,086,472 B1 | 8/2006 | Incoronato | |
| 7,438,803 B1* | 10/2008 | Allen | B01D 21/2483 |
| | | | 210/532.1 |
| 8,550,568 B2* | 10/2013 | Incoronato | E21B 43/36 |
| | | | 166/357 |
| 8,597,506 B2* | 12/2013 | Ilstad | E21B 43/36 |
| | | | 210/532.1 |
| 2016/0319652 A1* | 11/2016 | Kalli | E21B 43/36 |
| 2018/0016874 A1* | 1/2018 | Andersson | E21B 43/01 |

FOREIGN PATENT DOCUMENTS

| | | |
|---|---|---|
| WO | 00/39031 | 7/2000 |
| WO | 2010/005312 | 1/2010 |
| WO | 2014/044930 | 3/2014 |
| WO | 2014/083346 | 6/2014 |
| WO | 2015/082543 | 6/2015 |

OTHER PUBLICATIONS

Search Report dated Dec. 17, 2015 in Norwegian Application No. 20150796, with English translation.
Astrid Kristoffersen et al., "Flexible Subsea Storage Unit Development and Applications", 11 OTC-24537-MS, Oct. 31, 2013 (Oct. 31, 2013), pp. 1-8, XP055296037.

* cited by examiner

METHOD AND SYSTEM FOR SUBSEA SEPARATION OF PRODUCED WATER

The present invention relates to a method and system for subsea treatment of produced water. Especially the present invention relates to separation of solid particles and optionally hydrocarbons from produced water to provide a water fraction that can be discharged to the surrounding environment and optionally a hydrocarbon fraction that can be injected back into an upstream hydrocarbon handling process.

BACKGROUND

Offshore oil and gas wells often produce water together with the desired hydrocarbons. This water stream is referred to as produced water.

At present offshore platforms contain equipment for separating and cleaning produced water to allow for the water to be released to the environment, but this equipment requires platform space which is a limiting factor. The platform will normally comprise equipment to handle hydrocarbon fractions separated from the produced water however the platforms are not always equipped with systems for handling the solid fraction.

In some situations the solids may comprise compounds that may not be released into the environment without further treatment. Equipment for such treatment is normally not installed on the platform and the solids have to be transported to shore or another facility to be treated.

As an alternative to conventional topside processing on a platform, the well stream may be partially processed subsea, and consequently requires treating produced water subsea prior to release back to the environment. Subsea treatment of produced water prevents the seemingly unnecessary transport of produced water from seabed to surface.

OBJECTIVES OF THE INVENTION

The objective of the present invention is to provide a method for separation of particles/solids and possibly hydrocarbons from produced water, wherein said method can be performed subsea. A further objective is to provide for controlled handling of the separated particles and possibly hydrocarbons. It is an aim to provide a method that results in a water fraction that can be released to the environment either directly surrounding the equipment or as an injection stream into an injection well into the subsea formation. A further aim is to separate hydrocarbons from the produced water before releasing the water to the environment.

Especially the present invention aims at collecting the particles/solids to allow for environmentally adapted special treatment of the solids.

A further objective is to provide equipment especially adapted to perform said method.

The present invention provides a method for separation of produced water into a water fraction, a solids fraction and optionally a hydrocarbon fraction, comprising
feeding produced water into a collapsible flexible bag maintained subsea by a protection structure;
operating the flexible bag at an overpressure and thereby providing a predefined geometry of the flexible bag;
maintaining the produced water in the flexible bag to allow for gravitational separation of the solids fraction with a higher density than water in a lower section and optionally separation of the hydrocarbon fraction with a lower density than water in an upper section;
removing the water fraction from a section above the lower section;
optionally removing the hydrocarbon fraction from the upper section and
replacing the flexible bag to remove the solids fraction.

The overpressure, as referred to herein, is sufficient to inflate the flexible and keep the bag inflated. The overpressure is preferably below 0.5 bar compared to the hydrostatic pressure outside the bag, preferably in the range 0-0.1 bar, more preferably in the range 0.01-0.1 bar.

The overpressure $\Delta p$ is accordingly:
$0 \leq \Delta p < 0.5$ bar, preferably $0 < \Delta p \leq 0.1$ bar, more preferably $0.01 < \Delta p \leq 0.1$ bar.

When $p_B$ is the pressure within the bag and $p_h$ is the hydrostatic pressure outside the bag then $p_B = p_h + \Delta p$ The predefined geometry is the geometry defined by the material of the collapsible flexible bag. At the overpressure the flexible material in it self is generally not or to very limited extend expanded or stretched, so that the bag will take the shape defined by the configuration of the bag material.

The hydrocarbon fraction may contain both gas and oil. In one aspect of the invention the hydrocarbon fraction in the upper section is a produced water fraction with an increased concentration of hydrocarbons compared to the produced water to be separated. The hydrocarbon fraction being removed from the flexible bag can be transferred to a hydrocarbon separation step, such as an upstream separation step resulting in the separation of the produced water from the well stream. In this aspect the hydrocarbon fraction is still primarily a water fraction.

In one aspect of the method the replacing of the flexible bag is performed by replacing the flexible bag within the protection structure or by replacing the protection structure including the flexible bag for removal of solids.

When the flexible bag is replaced the solids separated from the water are contained within the bag. If only the bag is replaced the bag is designed to carry the weight of the solids when the bag is hoisted out of the water. If the protection structure including the flexible bag is replaced then the protection structure can be designed to stabilise the bag and carry the weight thereof distributed over a bottom section of the structure.

Accordingly, the present invention provides for collecting of the solids within the flexible bag. When the bag is replaced the produced water inlet is closed and a sufficient part of the water fraction is removed allowing the bag to partly collapse. The bag is then detached from the protection structure and removed including the solids retained therein. An empty collapsed bag is connected to the protection structure and produced water is allowed to fill and thereby inflate the bag and the method can be repeated.

Alternatively when the protection structure including the bag is replaced the produced water inlet is closed and a sufficient part of the water fraction is removed allowing the bag to partly collapse. The protection structure including the bag is then detached from all in- and outlets and removed including the solids retained therein. A protection structure comprising an empty collapsed bag is connected to the in- and outlets and produced water is allowed to fill the bag and thereby inflate the bag and the method can be repeated.

In one aspect of the method the filling of produced water and removal of the water fraction is performed continuously for a time period. The process of separating the water fraction that can be released to the environment is accordingly performed continuously. The feeding of produced water and removing the water fraction is only interrupted when the flexible bag is replaced, when the collected solids are removed. Preferably the time period between interruptions is at least 1 month, preferably at least 3 months, more preferred at least 6 months and even more preferably at least 12 months.

Preferably the method makes use of two or more flexible bags arranged in separate protection structures operated in parallel so that at least one flexible bag is always available for treatment of produced water when one bag is being replaced.

When the method is performed like this when the system is connected to a topside facility the subsea separation of produced water will not influence the topside processes as long as the subsea system has sufficient capacity to receive the produced water. The system may comprise several units with a collapsible, flexible bags arranged in a protection structure, and if larger capacity is required additional units can be added to provide additional produced water separation capacity.

Alternatively the method can be used in batch mode where the collapsed flexible bag is filled with produced water at an overpressure, the water is maintained in the bag to allow for gravitational separation, removing the water fraction from above the lower section, optionally removing hydrocarbons from the upper section, and replacing the flexible bag.

In one aspect of the method according to the present invention the produced water is fed to the flexible bag at a level below a level at which the water fraction is removed. This aspect is especially applicable where the system is used as a buffer tank or for smoothen out variations in the hydrocarbon content and accordingly where there is no or limited need for the method to result in separation of hydrocarbons from the produced water.

In another aspect of the method according to the present invention the produced water is fed to the flexible bag at a level above a level at which the water fraction is removed. This aspect is especially relevant when separation of hydrocarbons from the produced water is necessary to achieve a hydrocarbon concentration low enough to allow for disposal of the water fraction to the environment.

In a further aspect the produced water is fed and the water fraction is removed at a speed adapted to allow for sedimentation of at least 90 weight % of the solids in the produced water. In yet another aspect the speed is further adapted to allow for flotation of at least 90 weight % of the hydrocarbons in the produced water.

In a further aspect the present invention provides a subsea produced water separation system comprising
  a collapsible flexible bag, securable to a protection structure,
  a produced water inlet, a hydrocarbon outlet and a water fraction outlet all in fluid communication with the internal volume of the flexible bag, wherein the flexible bag is replaceable for collection of solids accumulated therein.

In one aspect of the subsea produced water system the hydrocarbon outlet is in direct fluid communication with an upper most section of the flexible bag, forming a hydrocarbon collection area.

The term "upper most" as used herein refers to an area of the flexible bag when aligned as intended for installation. Upper most refers to the upper area in relation to the gravity force enabling the separation.

In one aspect of the subsea produced water separation system the produced water inlet, and the water fraction outlet are both tube shaped elements comprising a free end with an opening arranged within a perforated pipe spanning the height of the flexible bag.

In another aspect of the subsea produced water separation system the opening of the water fraction outlet is arranged above the opening of the produced water inlet.

In yet another aspect of the subsea produced water separation system the opening of the water fraction outlet is arranged below the opening of the produced water inlet.

In a further aspect of the subsea produced water separation system the protection structure is arranged for deploying the system on the seafloor and for retrieving the flexible bag including the solids accumulated therein. The protection system is arranged for handling the flexible bag including the collected solids during transport from the seafloor to a topside facility. The possible disconnecting/connection of the separation system from/to inlet and outlet conduits and other subsea equipment can be performed by a ROV (remotely operated vehicle) and the exchange of the system can be performed by an IMR (inspection, maintenance and repair) vessel.

In another aspect the protection structure is an open frame structure with the flexible bag located inside the frame. The frame structure ads limited weight to the system and allows seawater to flow freely into the protection structure when the system is lowered into the sea and allows for the seawater to flow out when the system is retrieved and hoisted above sea level. This has a positive effect on the passage through the splash zone.

In a further aspect of the system the flexible bag when inflated takes the shape of an elongated cylinder. Here the produced water inlet may be arranged at one end of the elongated cylinder, and water is transported to the other end where the outlets are located at different levels to allow for separate fractions to be obtained.

In yet another aspect the system comprises an overpressure unit arranged for, when the system is in operation, keeping the bag at a constant overpressure with respect to the ambient water such as to maintain inflated condition of the bag. In one aspect the overpressure unit is a gravity pre-charged flapper valve at the water fraction outlet for providing a near constant overpressure.

In a further embodiment the system further comprises a water quality monitoring unit connected to the water fraction outlet with a sampling system, a motor driven pump and a hydraulic conduit connectable a receiver unit arrangeable topside on a platform.

The present invention further relates to the use of the subsea produced water separation system according to any one of the claims 9-13 for the separation of solids from produced water. It also relates to the use of the subsea produced water separation system for the separation hydrocarbons from produced water.

Further the present invention relates to the use of the subsea produced water separation system as a produced water buffer tank. In this aspect the system can be used to smoothen out variations in the hydrocarbon concentration. In this aspect if the normal produced water separation system does not provide sufficient reduction in hydrocarbon content to release the water to the environment the water is fed to the buffer tank which may provide for additional separation and/or for mixing the produced water back into a later obtained produced water stream which has a hydrocarbon content lower that the allowable threshold value. In this aspect the system also provides storage space for peak loads of produced water that a produced water handling system lacks capacity for handling. When the amount of produced water coming from the well(s) is normalised the temporarily subsea stored produced water can be fed back into the handling system and if necessary be further cleaned prior to release.

Two or more units each comprising a collapsible flexible bag within a protection structure and inlets and outlets can be connected to form a modular subsea produced water separation system where the units can be used in parallel. The size of each unit and the number of units is adapted to provide for the produced water to have sufficient resident time to allow for the sufficient amount of particles to settle and the sufficient amount of oil droplets and/or gas bobbles to raise to the upper section to result in a cleaned produced water fraction of acceptable quality.

The term "produced water" as used herein refers to a water fraction separated from a hydrocarbon well stream. Depending on the separation processes utilized and the initial processing of the well stream the produced water may in addition to water contain remaining hydrocarbons, sediment particles, salts, corrosion products and chemicals added to the well stream. The present invention relates to separating mainly two fractions from the produced water, a hydrocarbon fraction and a particle fraction comprising solid particles.

The term "fraction" as used herein is used in connection with a component name such as hydrocarbon and solids to describe a part of the produced water with significant increased content in the component compared to the produced water. The hydrocarbon fraction accordingly contains a high concentration of hydrocarbons compared to the produced water. The separation into the hydrocarbon, water and solids fractions will normally not be 100% so that the hydrocarbon and solids fraction will contain water. The amount of hydrocarbons and solid particles in the obtained water fraction is however intended to be so limited that the water fraction can be released to the environment. The water fraction will contain dissolved salts.

The terms "lower" and "upper" as used herein relate to a position relative to the direction of the gravitational force which the present invention makes use of to obtain separation.

BRIEF DESCRIPTION OF THE DRAWINGS

The present invention will be described in further detail with reference to the enclosed figures schematically illustrating embodiments thereof.

PRINCIPAL DESCRIPTION OF THE INVENTION

Figure 1:
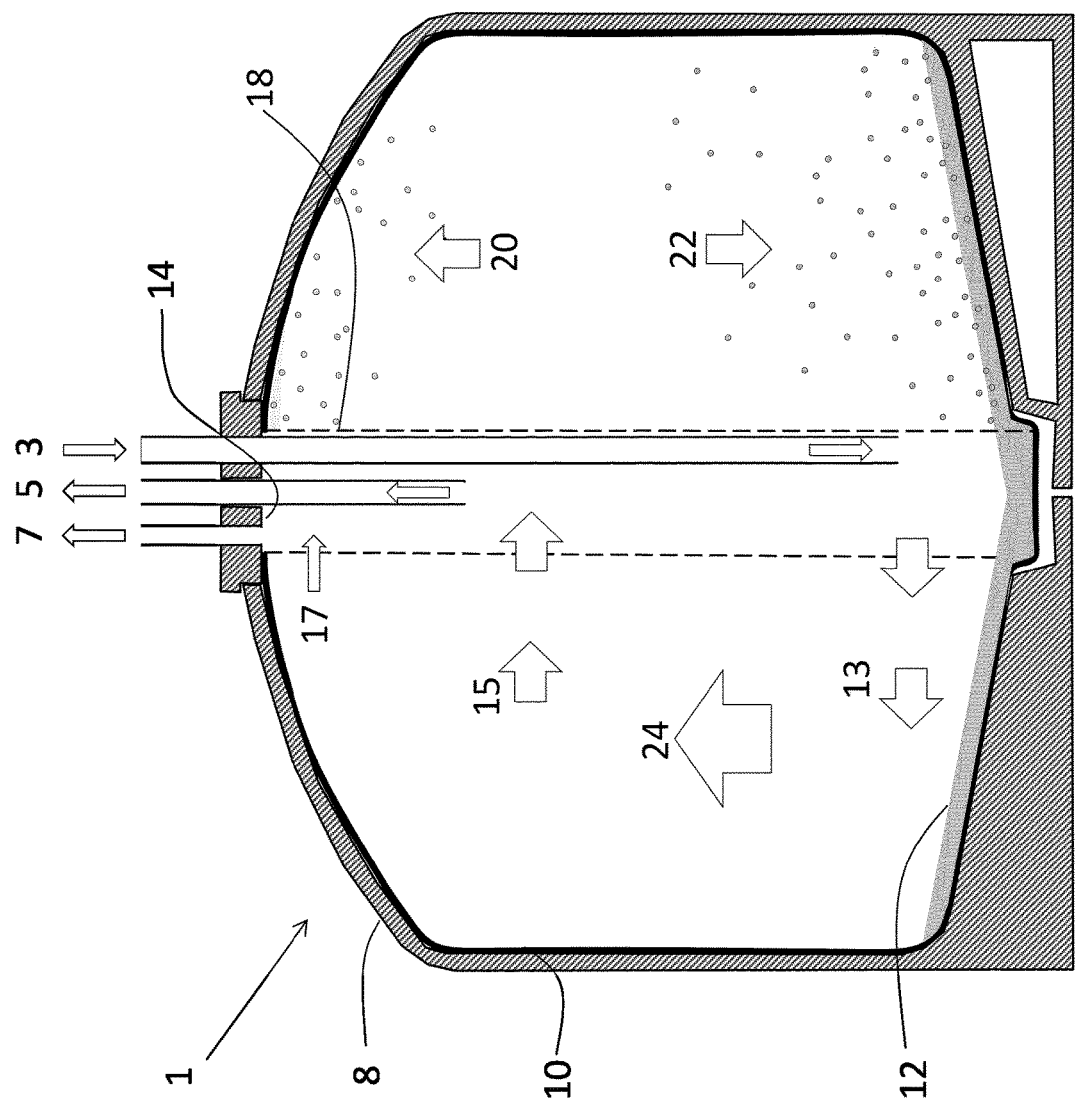
FIG. 1 illustrates solid settling in produced water from a topside process in a subsea facility.

The present invention is related to solutions to collect and retrieve solids for onshore treatment from produced water as well as solutions to discharge produced water with a low hydrocarbon content, preferably below 30 ppm directly to sea in compliance with authority regulative law.

One purpose of the flexible bag in this application will be to act as a collapsible separation vessel allowing for solids settlement and optionally hydrocarbon separation that needs to be removed from the produced water before it's released to sea.

Other possible purposes are to:
1) Act as a buffer tank to smoothen out variations in input liquid hydrocarbon content when the average hydrocarbon content is >30 ppm. This case corresponds to storing produced water from a topside facility, and the water depth where the separation/storage system is placed is less than 500 m typically around 100 m.
2) Act as a hydrocarbon separator in a subsea separation process preferably at higher water depths. Depths of above 500 m typically of more than 2000 m depth. In this case the system will form part of a fully subsea produced water treatment system. The hydrocarbon concentration in the pre-treated produced water will typically be around 100 ppm when it is fed to the system according to the present invention.

The temperature of the produced water will vary depending on the depth. Temperatures are field specific and the design will accommodate field specific requirements. At 100 m a produced water temperature of ~40° C. is typical and at 2200 m typically a higher temperature, ranging from <100° C. up to ~160° C. will be expected.

The amount of total suspended solid particle content within the produced water fed to the tank is expected to be around 20 mg/kg, however the system and method can be adapted to handle other particle loads.

A representative expected size distribution based on the weight for the total suspended solids is
    0.01-0.1 µm: 5%
    0.1-1 µm: 10%
    1-10 µm: 35%
    10-100 µm: 45%
    100-1000 µm: 5%

These values are provided only as an example and load and distribution will depend on the field and the equipment in use.

The main element of the separation system is the collapsible flexible bag in which the produced water is contained and in which the separation of solids take place. The bag is kept in position on the seabed by a protection structure. The Protection structure may be secured to the seabed by any known manner. The protection structure may fully or partly surround the flexible bag to protect it from harm and keep it in place. The density of the flexible bag when filled with produced water is not very different from the density of the surrounding water and the protection structure provides sufficient support to overcome any buoyancy. The flexible bag is either permanently fixated to the protection structure or disconnectably fixed to the protection structure. Replacement of the flexible bag can take place by discharging a major part of the water fraction from the bag and optionally at least a part of any hydrocarbon fraction, whereby the flexible bag is allowed to at least partly collapse, so that it can be removed either together with the protection structure or to be removed from the protection structure through an opening therein adapted to allow for the bag including the solids fraction collected and retained therein to be removed. The protection structure including the bag or the bag alone and is transported to a facility for handling of this fraction in an environmentally safe way, such facilities are often positioned onshore.

The bag material can consist of a fabric/weaving as the main structure providing the required mechanical properties and strength. A coating on each side is designed to protect the weaving, give it the necessary resistance to chemical degradation and make it liquid proof. Depending of the use and purpose the weaving and coating can be selected from numerous material alternatives.

The coated fabric is delivered in sheets on rolls and must be joined together in order to form a construction. Joining methods used are vulcanization. The joining quality and strength is designed to be at the same level as the base material to form a consistent construction. Only vulcanized rubber type of materials (elastomer-cross linked polymer) is expected to be suited to over long periods withstand aging caused by oil contaminated water, pressure and temperature.

FIG. 1 illustrates a first embodiment of the water treatment system 1 adapted to received produced water from a topside process through a produced water inlet 3. The system 1 is arranged on the seabed. The purpose of the system 1 is to separate solid particles for transport to a treatment facility and to act as a buffer tank to smoothen out any variation in incoming hydrocarbon content before disposal of the water fraction. The produced water is fed through the inlet 3 arranged inside the perforated pipe 18 arranged in the flexible bag 10. The bag 10 is surrounded by a protection structure 8.

Solids 12 are collected in the lower section due to gravity settling indicated by the settling arrow 22. The produced water travels from inlet 3 and as indicated by the arrow 13. The water fraction outlet 5 is via an opening in the tube shaped element also arranged within the perforated tube 18, but at a level above the opening of the inlet tube shaped element. This result in an upwards flow 24 of the water. In an example embodiment the flow could be sett to 0.8 m/h however this flow rate is controlled to achieve the separation required. The water fraction re-enters the perforated tube 18 as stream 15 and exits through water fraction outlet 5. Any hydrocarbon droplets in the form of oil or gas with a density below the density of the water fraction will be influenced by the flotation force 20. In the present example the produced water is expected to comprise only limited amounts of hydrocarbons, but any such droplets follow arrow 17 and will be concentrated in the uppermost section of the flexible bag, forming a hydrocarbon collection area 14. An opening of a hydrocarbon outlet 7 is arranged within the uppermost section of the flexible bag to allow for continuous or periodically removal of hydrocarbons.

Depending on the hydrostatic pressure hydrocarbon gas may separate from liquid hydrocarbons within the uppermost section of the flexible bag depending on the retention time. The hydrocarbon outlet should then be adapted to handle both hydrocarbon phases.

The bag is either permanently fixated to the protection structure or disconnectably fixed to the protection structure with inlet and outlets arranged in the top section of protection structure in the form of a hatch or directly on the flexible bag. For the case with a disconnectably fixed bag, the opening in the protection structure is sufficiently large to allow for the bag to pass when at least partly emptied of the water fraction but containing the retained solids. The partly emptying of the water fraction will result in the bag being at least partly collapsed. The bag is either removed through the opening of the protection structure and replaced by another flexible bag or retrieved with the protection structure to the surface for discharging of accumulated solids. The collected solids are transported to a facility for handling solid waste; often such facility is arranged onshore.

The bag may also be fixed to the protection structure in a variety of ways to accommodate an optimum design of the flexible bag as separator. Facilitating removal of solids or decommissioning by retrieval of the complete unit with a partially collapsed bag.

Figure 2:
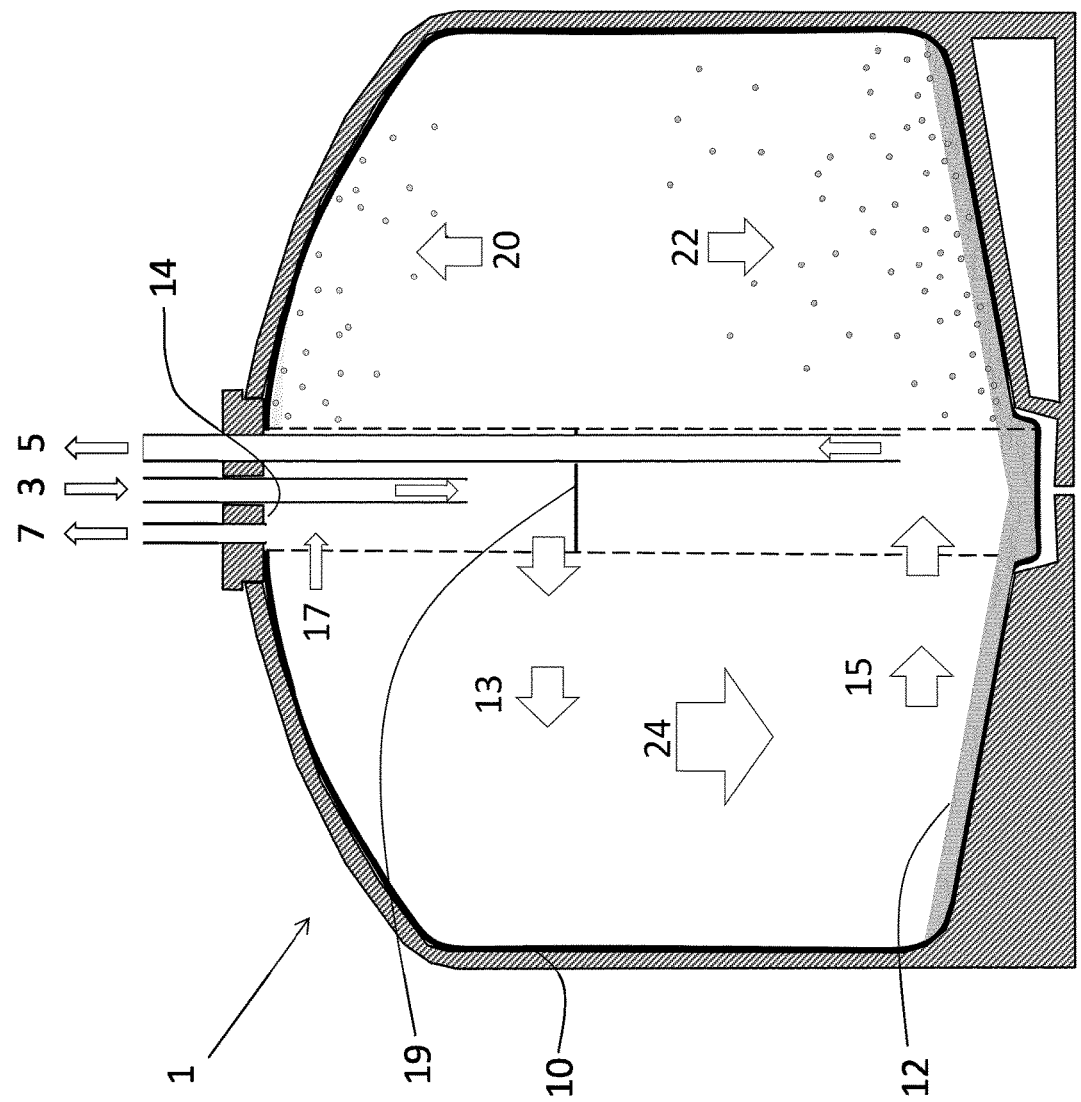
FIG. 2 illustrates subsea equipment for flotation of oil dispersion and solid settling of produced water pre-treated at a subsea treatment facility.

FIG. 2 illustrates an alternative embodiment of the present invention adapted to form part of a subsea produced water treatment plant, where the pre-treatment is performed subsea and the produced water will often have a higher content of hydrocarbons than in the embodiment according to FIG. 1.

In the embodiment on FIG. 2 the produced water received from a subsea process facility could for instance have a hydrocarbon content of around 100 ppm. The purposes of the process could be to separate the solid particles for transport to a treatment facility and to separate hydrocarbons to the required level of for instance below 30 ppm hydrocarbon content for disposal of the water fraction directly to sea.

The system illustrated in FIG. 2 contains the same elements as in FIG. 1 but with a different circulation of the water. The produced water enters through inlet 3 and via the opening in the tube shape element it enters the perforated tube in the upper part but below the uppermost section of the flexible bag 14 and flows into the flexible bag as stream 13, guided by a guiding plate 19. The guiding plate blocks the direct flow path within the perforated tube from the inlet 3 to the outlet 5. The stream continues slowly for instance at 0.4 m/h downwards with solids 12 settling 22 to form a sedimentation layer 12, and whereas flotation 20 results in hydrocarbons collecting in the uppermost section of the flexible bag 14. The water fraction re-enters the perforated tube as water fraction stream 15 and enters the opening of the tube shape water outlet 5. Said opening is arranged in the lower section, below the opening of the produced water inlet, but above the layer of solids 12.

The bag is replaced as a component or as part of the protection structure at regular intervals determined by the amount of solids retained and the bags ability to sustain the weight of the retained solids especially when the bag is lifted out of the water.

Figure 3:
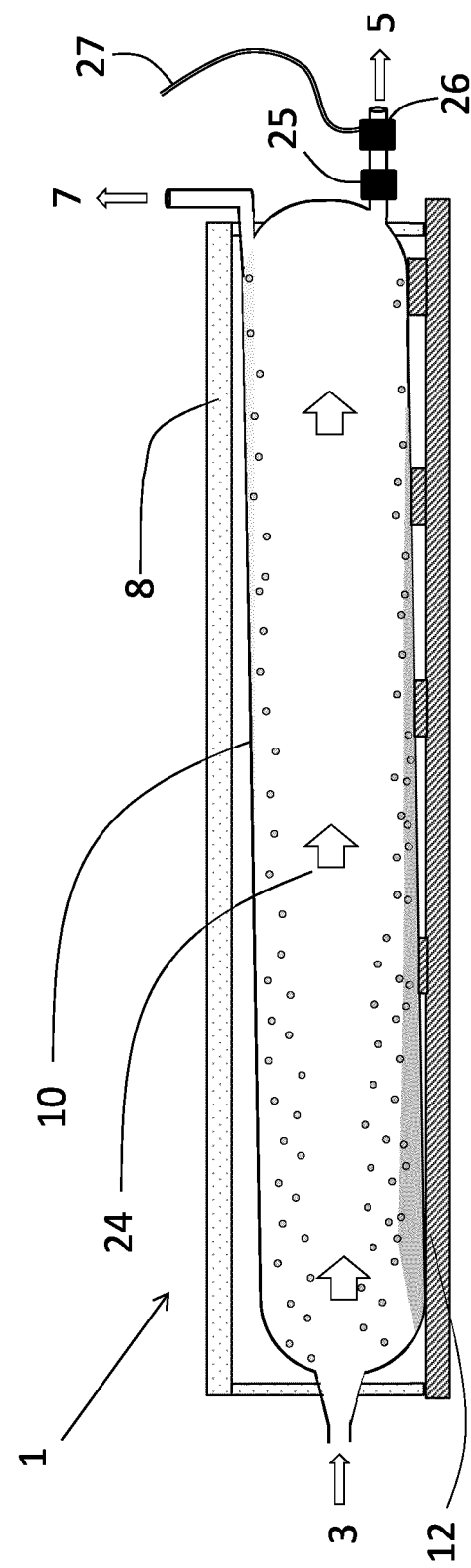
FIG. 3 illustrates another embodiment of the subsea equipment.

FIG. 3 illustrates an alternative embodiment of the present invention. The flexible bag 10 is here elongated and tube shaped with a produced water inlet 3 at one end thereof. The diameter of the tube shaped bag may increase in the flow direction thereby allowing for a reduction in the flow velocity and thereby increasing the separation efficiency by allowing the solid particles to settle and the hydrocarbon droplets to float up to the top of the bag. Outlets are located at the opposite end of the inlet, i.e. hydrocarbon outlet 7, water fraction outlet 5. The lower outlet is arranged above a minimum level in the bag to avoid settled solids from leaving the bag together with the water fraction. The embodiment illustrated on FIG. 3 may further comprise a protection structure 8 in the form of a cage like structure surrounding parts of the flexible bag 10 and keeping it positioned on the seabed while separation is performed.

An attractive feature of the embodiment suggested in FIG. 3 is a particularly cost effective fabrication and installation process. This particular shape of bag is currently in large-scale production for other industries, and current designs may readily be adapted to use as a subsea separator. In addition, a very large volume separator bag may be installed in a slim and light weight frame, facilitating cost effective installation by means of a standard IMR (inspection, maintenance and repair) vessel equipped with a standard crane (with the bag in the deflated state during installation). When the bag is in the deflated condition the frame and bag may easily be lowered through the splash zone with a minimum of added mass.

Also illustrated in FIG. 3 but applicable with all embodiments is the overpressure unit 25 at the water fraction outlet. This unit is arranged to provide sufficient overpressure in the bag to insure full inflation allowing the full bag volume to be utilized for separation. The overpressure unit may be a flapper valve or another type/types of valve or orifice providing this function.

Further FIG. 3 illustrates the inclusion of a water quality monitoring unit 26 optionally with a hydraulic conduit 27 arranged in connection with the water fraction outlet, this can similarly be included in other embodiments of the invention. The monitoring unit is adapted for measuring the water quality of the water fraction. This can be performed by known methods for measuring the amount of particles and/or hydrocarbons in the water. Optionally the monitoring unit may comprise a pump for transferring test samples of the water via the hydraulic conduit to a topside facility for analysis.

Figure 4:
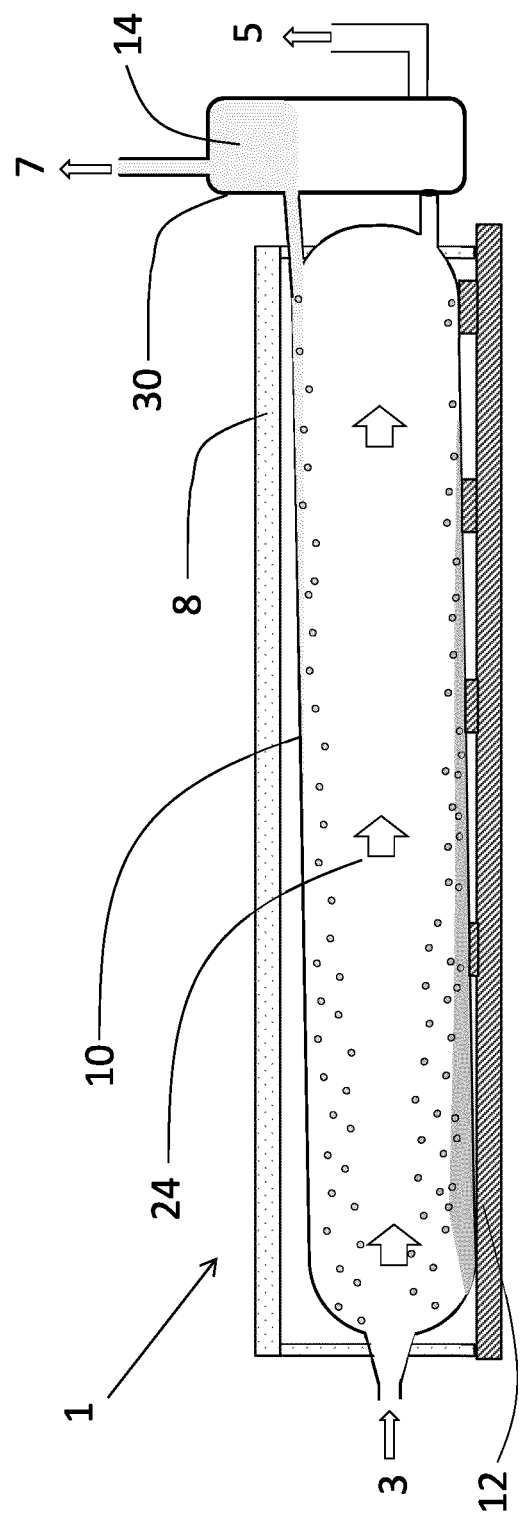
FIG. 4 illustrates a further embodiment of the subsea equipment.

FIG. 4 illustrates an alternative embodiment of the present invention. The flexible bag 10 is here elongated and tube shaped with a produced water inlet 3 at one end thereof. The diameter of the tube shaped bag may increase in the flow direction thereby allowing for a reduction in the flow velocity and thereby increasing the separation efficiency by allowing the solid particles to settle and the hydrocarbon droplets to float up to the top of the bag. Outlets are located at the end opposite end of the inlet, i.e. the bag is connected to an outlet structure comprising in the upper section the hydrocarbon collection area 14 with the hydrocarbon outlet 7 and in the lower section the water fraction outlet 5. The bag and the lower section are in fluid communication through at least the two shown channels. The lower outlet channel is arranged above a minimum level in the bag to avoid settled solids from leaving the bag together with the water fraction and entering the outlet structure. The embodiment illustrated on FIG. 4 may further comprise a protection structure 8 in the form of a cage like structure surrounding parts of the flexible bag 10 and keeping it positioned on the seabed while separation is performed.

In all embodiments of the separation system sensors can be included to detect the status of the system and the correct functioning. With reference to FIG. 3, sensors can be included to detect the following:

1. quality of the clean water phase. The monitoring unit may comprise a sampling system, including a small, motor-driven pump, may conduct a minor, but representative, fraction of the clean water phase in a small bore conduit to a topside facility for monitoring of water quality. The small bore conduit would normally be embedded in the control umbilical.
2. Produced water inlet and outlet temperature. These are standard subsea items of equipment.
3. Solids deposition level. Solids accumulation may be detected by means of at least 1 acoustic sensors or an array of such sensors.
4. Oil content in the hydrocarbon fraction 7. Although this volume of water contains most of the oil, it may still be dominantly a water phase with a small fraction of free oil droplets. Subsea instruments for this task have been developed and demonstrated. A sampling system similar to the monitoring unit could also be used to monitor oil content in a topside facility.
5. Differential pressure between bag internal volume and the ambient sea. This reading may be used to adjust the overpressure unit for internal overpressure in the bag (in operation), or even to control it. The internal overpressure must be minor (preferably <0.1 bar) to protect the bag.

Oil escaping from the bag in FIGS. 1 and 2 will collect in an annulus located between the flexible bag and the protection structure.

For oil level monitoring in the uppermost section of the flexible bag, the proposed solution may use an inductive sensor measuring electrical conductivity of the oil/water mixture. Such sensors have been demonstrated for higher levels of oil contamination. A sensor on top of the hatch in the design according to FIGS. 1 and 2 or on top of the outlet structure of FIG. 3 may be included to measure temperature of the hydrocarbon fraction, and the temperature should be above hydrate formation temperature. The hatch or the outlet structure is preferably insulated, and temperature measurements can be measured in the steel structure, in order to simplify arrangement and maintenance.

A temperature sensor is also mounted on the produced water inlet and the water fraction outlet, to enable monitoring and control of hydrate. The temperature is measured on the pipe steel, which also could be insulated.

Sensors could allow for an estimation of the total weight of solids in the bag, which determines when the bag must be replaced. To measure the level of solid sediments that accumulate on the floor of the bag, an acoustic sensor may be used. To prevent a masking of the acoustic signal through reflection and refraction at the expected multiple boundaries between gas, oil, hydrate slush and produced water (which might even be degassing with bubbles), mounting of the acoustic sensor at the bottom of the system outside the bag is a possibility.

The acoustic sensor could be designed as a wideband echo sounder, which increases range and resolution of the system.

Discharge of clean water quality may be monitored by a sampling system and a topside analysis. The sampling system consists of a motor driven pump and a small hydraulic conduit back to the platform.

A fluorescent sensor (in a topside application) can be used to complement the computed hydrocarbon content.

REFERENCE NUMBERS

1 Separation system
3 Produced water inlet
5 Water fraction outlet
7 Hydrocarbon outlet
8 Protection structure
10 Flexible bag
12 Solids
13 Produced water in
14 Hydrocarbon collection area, uppermost section of flexible bag
15 Water fraction out
17 Hydrocarbon (oil/gas) out
18 Perforated pipe
19 Guiding plate
20 Flotation
22 Settling
24 Circulation
25 Overpressure unit
26 Water quality monitoring unit
27 Hydraulic conduit
30 Outlet structure

The invention claimed is:

1. A method for separation of produced water into a water fraction and a solids fraction, the method comprising:

feeding produced water into a collapsible flexible bag maintained subsea by a protection structure;

operating the flexible bag at an overpressure and thereby providing a predefined geometry of the flexible bag;

maintaining the produced water in the flexible bag to allow for gravitational separation of the solids fraction with a higher density than water in a lower section;

removing the water fraction from a section above the lower section; and replacing the flexible bag to remove the solids fraction.

2. The method according to claim 1, wherein the replacing of the flexible bag is performed by replacing the flexible bag within the protection structure or by replacing the protection structure including the flexible bag.

3. The method according to claim 1, wherein the feeding of produced water and removing the water fraction is performed continuously for a time period.

4. The method according to claim 1, wherein the produced water is fed to the flexible bag at a level below a level at which the water fraction is removed.

5. The method according to claim 1, wherein the produced water is fed to the flexible bag at a level above a level at which the water fraction is removed.

6. The method according to claim 1, wherein the maintaining of the produced water in the flexible bag to allow for gravitational separation of the solids fraction with the higher density than water in the lower section includes separation of a hydrocarbon fraction with a lower density than water in an upper section; and the method further comprising removing hydrocarbons from the upper section.

7. A subsea produced water separation system comprising
a flexible bag, securable to a protection structure,
a produced water inlet, a hydrocarbon outlet, and a water fraction outlet all in fluid communication with an internal volume of the flexible bag, wherein the flexible bag is replaceable for collection of solids accumulated therein;
wherein the produced water inlet; and the water fraction outlet are both tube shaped elements comprising a free end with an opening arranged within a perforated pipe spanning the height of the flexible bag.

8. The subsea produced water separation system according to claim 7, wherein the protection structure is arranged for deploying the system on the seafloor and for retrieving the flexible bag including the solids accumulated therein.

9. The subsea produced water separation system according to claim 7, wherein the hydrocarbon outlet is in direct fluid communication with an upper most section of the flexible bag.

10. The subsea produced water separation system according to claim 7, wherein the opening of the water fraction outlet is arranged above the opening of the produced water inlet.

11. The subsea produced water separation system according to claim 7, wherein the opening of the water fraction outlet is arranged below the opening of the produced water inlet.

12. The subsea produced water separation system according to claim 7, wherein the protection structure is an open frame structure with the flexible bag located inside the frame.

13. The subsea produced water separation system according to claim 7, wherein the system comprises an overpressure unit arranged for when the system is in operation keeping the bag at a constant overpressure with respect to the ambient water to maintain an inflated condition of the bag.

14. The subsea produced water separation system according to claim 13, wherein the overpressure unit is a gravity pre-charged flapper valve at the water fraction outlet for providing a near constant overpressure.

15. The subsea produced water separation system according to claim 7, wherein the system further comprises a water quality monitoring unit connected to the water fraction outlet with a sampling system, a motor driven pump, and a hydraulic conduit connectable to a receiver unit arrangeable topside on a platform.

16. A use of the subsea produced water separation system according to claim 7 for the separation of solids from produced water.

17. A use of the subsea produced water separation system according to claim 7 for the separation hydrocarbons from produced water.

18. A use of the subsea produced water separation system according to claim 7 as a produced water buffer tank.

19. A subsea produced water separation system comprising
a flexible bag, securable to a protection structure,
a produced water inlet, a hydrocarbon outlet, and a water fraction outlet all in fluid communication with an internal volume of the flexible bag, wherein the flexible bag is replaceable for collection of solids accumulated therein;
wherein the flexible bag when inflated takes the shape of an elongated cylinder, and
wherein the produced water inlet is located at a first end of the elongated cylinder, and the water fraction outlet is located at a second end of the elongated cylinder, the first end being opposite the second end.

* * * * *